United States Patent [19]

Kung et al.

[11] Patent Number: 5,925,701
[45] Date of Patent: Jul. 20, 1999

[54] STABLE AQUEOUS POLYMERIC DISPERSIONS CONTAINING HYDRATED METAL SALTS OF STRONG ACIDS

[75] Inventors: Teh-Ming Kung, Rochester; Mary C. Brick, Webster; Michael W. Orem, Rochester; Robin E. Osterhout, Fairport; Terry C. Schultz, Hilton, all of N.Y.

[73] Assignee: Eastman Kodak Company, Rochester, N.Y.

[21] Appl. No.: 08/995,806

[22] Filed: Dec. 22, 1997

Related U.S. Application Data

[51] Int. Cl.$^6$ ............... C08K 3/10; C08K 3/30; C08K 3/29
[52] U.S. Cl. ............... 524/423; 524/413; 524/429; 524/410; 524/434; 524/435; 524/437
[58] Field of Search ............... 524/413, 423, 524/429, 410, 434, 435, 437

[56] References Cited

U.S. PATENT DOCUMENTS

| | | | |
|---|---|---|---|
| 4,460,439 | 7/1984 | Barlow et al. | 204/501 |
| 4,680,332 | 7/1987 | Hair et al. | 524/377 |
| 5,657,931 | 8/1997 | Nair et al. | 241/21 |

FOREIGN PATENT DOCUMENTS

| | | | |
|---|---|---|---|
| 35053 | 9/1974 | Japan | 524/434 |

OTHER PUBLICATIONS

Grant & Hackh's Chemical Dictionary, 5$^{th}$ Edition pp. 28, 46, 593, 598, 638.
JP Abstract 56/049079.

*Primary Examiner*—Peter A. Szekely
*Attorney, Agent, or Firm*—Andrew J. Anderson

[57] ABSTRACT

An aqueous dispersion comprising a dispersed polymer is disclosed, obtained by combining (i) the dispersed polymer (ii) a hydrated metal salt of a strong acid, and (iii) a polymeric surfactant comprising a hydrophobic component containing an aryl radical containing at least 7 carbon atoms and a hydrophilic block component containing at least six repeat units derived from water-soluble monomers, or a multifunctional block copolymeric surfactant derived from the sequential addition of propylene oxide or higher alkylene oxide units and subsequently ethylene oxide units to a polyamine moiety. It has been found that the addition of such polymeric surfactants in accordance with the invention can stabilize an aqueous polymeric dispersion or latex even when hydrated metal salts of strong acids, such as $Al_2(SO_4)_3.18H_2O$, $AlCl_3.6H_2O$, $Al(NO_3)_3.9H_2O$, $Zn(NO_3)_2.6H_2O$ etc., are present.

20 Claims, No Drawings

5,925,701

STABLE AQUEOUS POLYMERIC DISPERSIONS CONTAINING HYDRATED METAL SALTS OF STRONG ACIDS

CROSS REFERENCE TO RELATED APPLICATIONS

Reference is made to copending, commonly-assigned, concurrently filed U.S. patent application Ser. No. 08/995,225 (Kodak Docket No. 76139HEC) of Guistina et al., the disclosure of which is incorporated by reference herein.

FIELD OF THE INVENTION

This invention relates to polymer latex dispersions containing acidic metal salts and polymeric surfactants.

BACKGROUND OF THE INVENTION

Aqueous polymeric dispersions are well known and useful for many purposes. Such dispersions may be used, e.g, in polymeric layer coating and paint compositions. Polymeric layer coating compositions are particularly useful in preparing polymeric layers for use in imaging elements and printing media, such as thermal dye transfer or ink jet ink receiver elements or printing media. Aqueous polymer latex dispersions typically comprise a relatively hydrophobic polymer dispersed in an aqueous medium (i.e., the polymer is sufficiently hydrophobic so as not to be dissolved in the aqueous medium). To aid in dispersion, latexes typically comprise an ionic surfactant, or the polymer itself comprises a minor fraction of ionic monomer units.

Aqueous polymeric dispersions containing hydrated metal salts of strong acids may advantageously be used to prepare dye-receiving layers for a dye-receiving element of a thermal dye transfer assemblage as disclosed in copending, commonly-assigned, concurrently filed U.S. patent application Ser. No. 08/995,225 (Kodak Docket No. 76139HEC) of Guistina et al. incorporated by reference above. As disclosed therein, such receiving elements are particularly useful for receiving deprotonated cationic dyes which are capable of being reprotonated by the strong acid salts. Alternatively, such dispersions may be useful in other applications where it may be desirable to coat or transfer compositions comprising polymers and strong acid salts, such as for preparing ink-jet printing inks or printing media, or industrial paints. However, many aqueous polymeric dispersions typically are not stable and easily flocculate under ambient conditions in the presence of salts of strong acids. It would be desirable to provide polymeric dispersions which are stable in the presence of salts of strong acids.

U.S. Pat. No. 5,657,931 relates to the use of polymeric surfactants having an HLB number of at least 8 to stabilize a fine solid particle aqueous dispersion comprising dispersed particles of substantially water-insoluble, non-polymeric, organic compounds useful in imaging, such as, filter dyes, sensitizing dyes, and thermal transfer dyes.

U.S. Pat. No. 4,680,332 relates to the use of non-ionic polymeric stabilizers to prepare particulate inks for ink jet printing applications.

U.S. Pat. No. 4,460,439 relates to the stabilization of a film-forming polymer dispersion electrodeposited onto a cathodic conductive substrate by using a polymeric nonionic hydrophilic moiety being contained or associated with this particular film-forming polymer.

JP 56/049079 relates to the use of a nonionic surfactant, e.g., polyoxyethylene alkyl (alkylaryl) ether, to stabilize a nickel complex light stabilizer for textile goods consisting of protein or polyamide fibers.

There is no disclosure or teaching in any of such references, however, of the use of specific selected dispersant or surfactant compounds to stabilize a polymeric dispersion containing hydrated metal salts of strong acids.

SUMMARY OF THE INVENTION

In accordance with one embodiment of the invention, an aqueous dispersion comprising a dispersed polymer is disclosed, obtained by combining (i) the dispersed polymer (ii) a hydrated metal salt of a strong acid, and (iii) a polymeric surfactant comprising a hydrophobic component containing an aryl radical containing at least 7 carbon atoms and a hydrophilic block component containing at least six repeat units derived from water-soluble monomers, or a multifunctional block copolymeric surfactant derived from the sequential addition of propylene oxide or higher alkylene oxide units and subsequently ethylene oxide units to a polyamine moiety. It has been found that the addition of such polymeric surfactants can stabilize an aqueous polymeric dispersion or latex even when hydrated metal salts of strong acids, such as $Al_2(SO_4)_3 \cdot 18H_2O$, $AlCl_3 \cdot 6H_2O$, $Al(NO_3)_3 \cdot 9H_2O$, $Zn(NO_3)_2 \cdot 6H_2O$ etc., are present.

DESCRIPTION OF THE PREFERRED EMBODIMENTS

The dispersed polymers employed in the aqueous dispersions of the invention may include condensation polymers such as polyesters, polyurethanes, polycarbonates, etc.; addition polymers such as polystyrenes, vinyl polymers, acrylic polymers, etc.; or copolymers containing segments of more than one type of polymer covalently linked together. The polymeric dispersions may include latex polymers prepared by emulsion polymerization, or dispersed addition or condensation polymers, prepared by emulsification of a polymer solution, or self-dispersing polymers. The dispersed polymer may be nonionic, or may include ionic units. In accordance with a preferred embodiment of the invention, the dispersed polymer comprises a film-forming binder which may be used in polymeric layer coating compositions.

In a preferred embodiment of the invention, the dispersed polymer comprises a polyester polymer. Particularly preferred are aqueous dispersions comprising polyesters containing ionic monomer units, and especially polyesters synthesized from dicarboxylates and diols according to the following structure:

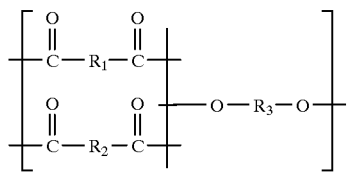

wherein $R_1$ is derived from an aliphatic dicarboxylate, such as adipate, suberate, or sebacate; a cycloaliphatic dicarboxylate, such as cyclopentanedicarboxylate or cyclohexandicarboxylate; an aromatic dicarboxylate, such as isophthalate or terephthalate; or a mixture of any of these;

$R_2$ is derived from a sulfonated dicarboxylate, such as 5-(4-sulfophenoxy)benzene(-1,3)-dicarboxylate, 5-sulphoisophthalate, 5-sulpho-1,3-cyclohexanedicarboxylate or sulfosuccinate;

$R_3$ is derived from an aliphatic diol such as ethylene glycol, propanediol, hexanediol, or decanediol; a fatty acid dimer diol such as Pripol 220® (Unichema Int.); a cycloaliphatic diol, such as cyclohexanedimethanol or tricyclodecanedimethanol; a glycol, such as diethylene glycol, hexaethylene glycol, propylene glycol, tripropylene glycol; prepolymers such as polyethylene glycol or polypropylene glycol; or a mixture of any of these.

In the above formula, $R_1$ may preferably range from about 35 to about 45 mole percent, $R_2$ may preferably range from about 5 to about 15 mole percent, with the balance being $R_3$.

While acidified versions of such ionic polymers may be used, polymers having no or only slight acidity (e.g., which exhibit pKa values of greater than about 5.5) are preferred, as such polymers are generally more structurally stable in acidic environments.

Preferred polyesters include Polymers P-1 through P-12 of the general structure shown below, for which the molar ratios of the repeat units are shown in Table 1.

TABLE 1

[Structure showing polyester repeat units with cyclohexanedicarboxylate, -OCH$_2$-cyclohexyl-CH$_2$O-, -C(O)-(CH$_2$)$_8$-C(O)-, sulfoisophthalate with SO$_3$Na, and R groups]

| | R | mole % R | Mole % SIP[a] | Mole % CHDC[b] | Mole % SEB[c] | Mole % CHDM[d] | Tg (° C.) |
|---|---|---|---|---|---|---|---|
| P-1 | Poly(propylene) glycol) MW 4000 | 1 | 8 | 42 | 0 | 49 | 53 |
| P-2 | Poly(ethylene) glycol) MW 200 | 1 | 8 | 42 | 0 | 49 | 32 |
| P-3 | Poly(ethylene) glycol) MW 2000 | 1 | 8 | 42 | 0 | 49 | 21 |
| P-4 | Poly(propylene) glycol) MW 425 | 6 | 8 | 42 | 0 | 44 | 13 |
| P-5 | Poly(ethylene) glycol) MW 200 | 16 | 8 | 42 | 0 | 34 | 11 |
| P-6 | Poly(propylene) glycol) MW 425 | 82 | 8 | 42 | 0 | 42 | 4 |
| P-7 | Poly(ethylene) glycol) MW 2000 | 2 | 8 | 42 | 0 | 48 | 2 |
| P-8 | Poly(ethylene) glycol) MW 2000 | 2 | 8 | 42 | 21 | 48 | 0.1 |
| P-9 | Poly(ethylene) glycol) MW 2000 | 2 | 8 | 21 | 21 | 48 | −21 |
| P-10 | Poly(ethylene) glycol) MW 200 | 16 | 8 | 21 | 21 | 34 | −22 |
| P-11 | Poly(propylene) glycol) MW 425 | 6 | 8 | 21 | 21 | 44 | −24 |
| P-12 | Poly(propylene) glycol) MW 425 | 8 | 8 | 21 | 21 | 42 | −25 |

[a]SIP = sulfoisophthalate (sodium slat)
[b]CHDC = 1,4-cyclohexanedicarboxylate
[c]SEB = sebacate
[d]CHDM = cyclohexanedimethanol An additional preferred polymer for use in the dispersions of the invention, P-13, is AQ29D® anionic polyester (Eastman Chemical Company), poly[isophthalic acid-co-5-sulfoisophthalic acid (90:10 molar ratio)-diethylene glycol (100 molar ratio)], provided as the sodium salt.

Further preferred polyesters include Polymers P-14 through P-23 of the general structure shown below, for which the molar ratios of the repeat units are shown in Table 2.

TABLE 2

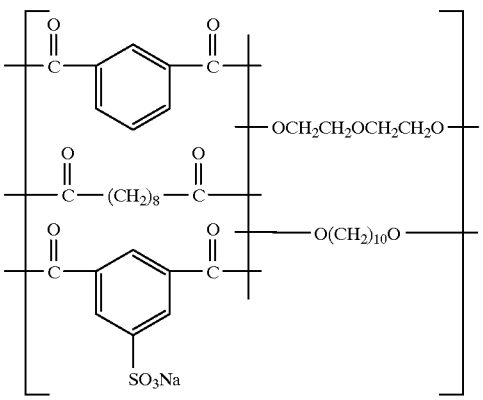

| | mole % isophthalate | Mole % 5-sulpho-isopthalate | mole % sebacate | mole % diethylene glycol | mole % decane diol | Tg °C. |
|---|---|---|---|---|---|---|
| P-14 | 45 | 5 | 0 | 50 | 0 | 27 |
| P-15 | 45 | 5 | 0 | 45 | 5 | 19 |
| P-16 | 45 | 5 | 0 | 40 | 10 | 8 |
| P-17 | 45 | 5 | 0 | 35 | 15 | 10 |
| P-18 | 45 | 5 | 0 | 30 | 20 | 2 |
| P-19 | 45 | 5 | 0 | 25 | 25 | -3 |
| P-20 | 40 | 5 | 5 | 50 | 0 | 14 |
| P-21 | 35 | 5 | 10 | 50 | 0 | 3 |
| P-22 | 30 | 5 | 15 | 50 | 0 | -14 |
| P-23 | 25 | 5 | 10 | 50 | 0 | -20 |

Additional polymers which may be used alone or in combination with the above polyester polymers in dispersions in accordance with the invention include the following P-24 through P-36:

P-24: poly(butyl acrylate-co-allyl methacrylate) 98:2 wt core/poly(glycidyl methacrylate) 10 wt shell, (Tg=-40° C.)

P-25: poly(butyl acrylate-co-allyl methacrylate) 98:2 wt core/poly(ethyl methacrylate) 30 wt shell, (Tg=-41° C.)

P-26: poly(butyl acrylate-co-allyl methacrylate) 98:2 wt core/poly(2-hydroxypropyl methacrylate) 10 wt shell, (Tg=-40° C.)

P-27: poly(butyl acrylate-co-ethylene glycol dimethacrylate) 98:2 wt core/poly(glycidyl methacrylate 10 wt shell, (Tg=-42° C.)

P-28: poly(butyl acrylate-co-allyl methacrylate-co-glycidyl methacrylate) 89:2:9 wt, (Tg=-34° C.)

P-29: poly(butyl acrylate-co-ethylene glycol dimethacrylate-co-glycidyl methacrylate) 89:2:9 wt (Tg=-28° C.)

P-30: poly(butyl methacrylate-co-butyl acrylate-co-allyl methacrylate) 49:49:2 wt core/poly(glycidyl methacrylate) 10 wt shell, (Tg=-18° C.)

P-31: poly(methyl methacrylate-co-butyl acrylate-co-2-hydroxyethyl methacrylate-co-2-sulfoethyl methacrylate sodium salt) 30:50:10:10 wt, (Tg=-3° C.)

P-32: poly(methyl methacrylate-co-butyl acrylate-co-2-hydroxyethyl methacrylate-co-styrenesulfonic acid sodium salt) 40:40:10:10 wt, (Tg=0° C.)

P-33: poly(methyl methacrylate-co-butyl acrylate-co-2-sulfoethyl methacrylate sodium salt-co-ethylene glycol dimethacrylate) 44:44:10:2 wt, (Tg=14° C.)

P-34: poly(butyl acrylate-co-Zonyl TM® (fluoroalkylmethacrylate available from DuPont)-co-2-acrylamido-2-methyl-propanesulfonic acid sodium salt) 50:45:5 wt (Tg=-39° C.)

P-35: XU31066.50 (experimental polymer based on a styrene butadiene copolymer from Dow Chemical Company) (Tg=-31° C.)

P-36: AC540® nonionic emulsion (Allied Signal Co.) (Tg=-55° C.)

The dispersed polymer employed in aqueous dispersions in accordance with the invention may be present in any amount which is effective for its intended purpose. In general, concentrations of from about 1 to 50 wt % are specifically contemplated, although concentrations outside such range may be used if desired.

A strong acid for the purposes of the invention comprises an acid having a pKa of less than or equal to about 2.0, where pKa represents the logarithmic value of the reciprocal of the dissociation constant (See, for example, section D-126 in CRC Handbook of Chemistry and Physics, 54th Ed.). Representative strong acids include, e.g., sulfuric, nitric, and hydrochloric acids. The hydrated metal salt of a strong acid useful in the invention include various hydrated forms of the following metal salts: aluminum sulfate, aluminum nitrate, aluminum chloride, potassium aluminum sulfate (alum), zinc sulfate, zinc nitrate, zinc chloride, nickel sulfate, nickel nitrate, nickel chloride, ferric sulfate, ferric chloride, ferric nitrate, cupric sulfate, cupric chloride, cupric nitrate, antimony (III) chloride, cobalt (II) chloride, ferrous sulfate, stannic chloride, aluminum trichloroacetate, zinc bromide, aluminum tosylate, zirconium (IV) chloride, etc. Mixtures of the above salts and complex salts thereof may also be used. In a preferred embodiment of the invention, the following hydrated metal salts of a strong acid may be used:

MS-1: $Al_2(SO_4)_3 \cdot 18H_2O$

MS-2: $AlK(SO_4)_2 \cdot 12H_2O$

MS-3: $NiSO_4 \cdot 6H_2O$

MS-4: $ZnSO_4 \cdot 7H_2O$

MS-5: $CuSO_4 \cdot 5H_2O$

MS-6: $Fe_2(SO_4)_3 \cdot 4H_2O$

MS-7: $Al(NO_3)_3 \cdot 9H_2O$

MS-8: $Ni(NO_3)_2 \cdot 6H_2O$

MS-9: $Zn(NO_3)_2 \cdot 6H_2O$

MS-10: $Fe(NO_3)_3 \cdot 9H_2O$

MS-11: $AlCl_3 \cdot 6H_2O$

Any amount of hydrated metal salt of a strong acid can be used in the dispersions of the invention which may be effective for its intended purpose. For coating compositions prepared for use in thermal dye transfer receiving elements, the concentration should be sufficient, e.g, to fully protonate the dyes transferred to the receiver. In general, good results have been obtained when the hydrated metal salt of a strong acid is employed in the aqueous dispersion at a weight ratio of from about 1:30 to 1:2, more preferably from about 1:20 to 1:5, and most preferably about 1:10, relative to the concentration of the dispersed polymer.

The general classes of polymeric surfactants for use in the aqueous dispersions in accordance with the invention are water-soluble or water-dispersible polymers. Preferably, such surfactants have an HLB number of at least 8, more preferably at least about 11, and most preferably at least about 14. The HLB number of a surfactant is a measure of the hydrophilic/lipophilic balance of the compound and can be determined as described in "Polymeric Surfactants," Surfactant Science Series, volume 42, page 221, by I. Piirma.

Preferred polymeric surfactants in accordance with one embodiment of the invention comprise a hydrophilic component containing at least six repeat units (preferably from 8 to about 100 repeat units, more preferably at least 10 repeat units, and most preferably at least 14 repeat units) derived from water-soluble monomers, and a hydrophobic component containing a substituted aryl radical containing at least 7 carbon atoms (preferably 12 to 30 carbon atoms, and more preferably 14 to 18 carbon atoms). The hydrophilic component preferably comprises a poly(ethylene oxide) unit, but can be any other water-soluble unit, such as polyethyloxazoline, poly(vinyl alcohol), poly(vinyl pyrrolidone), poly(glycidol) or the like. Particularly preferred surfactants for use in the invention comprise aryl polyoxyethylene ether surfactants represented by Formula I:

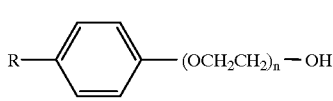

I where R is an aryl, alkyl or aralkyl group having from 1 to about 20 carbon atoms, more preferably 6 to 16 carbon atoms, and n has an average value greater than or equal to 10, preferably from about 14 to about 100.

Examples of preferred surfactants according to Formula I and similar compounds include the following:

| SURFACTANT | TRADE NAME (MANUFACTURER) | R— | n | HLB |
|---|---|---|---|---|
| D-1 | TRITON X-165 (UNION CARBIDE) | octylphenol | 16 | 15.8 |
| D-2 | TRITON X-305 (UNION CARBIDE) | octylphenol | 30 | 17.3 |
| D-3 | TRITON X-405 (UNION CARBIDE) | octylphenol | 40 | 17.7 |
| D-4 | TRITON X-705 (UNION CARBIDE) | octylphenol | 70 | 18.7 |
| D-5 | SYN FAC 8216 (MILLIKEN CHEMICAL) | bisphenol A based arylphenol | 10–25 | 15 |
| D-6 | SYN FAC 334-13 (MILLIKEN CHEMICAL) | bisphenol A based arylphenol | 10–25 | 13 |
| D-7 | OLIN 10G (OLIN CHEMICALS) | para-nonylphenol | 8–10* | 15.4 |

*glycidol units rather than ethylene oxide units

| SURFACTANT | TRADE NAME | MANUFACTURER | MW | HLB |
|---|---|---|---|---|
| D-8 | TETRONIC ® 1107 | BASF Corp. | 15000 | 24 |
| D-9 | TETRONIC ® 1307 | BASF Corp. | 18000 | 24 |
| D-10 | TETRONIC ® 904 | BASF Corp. | 6700 | 15 |
| D-11 | TETRONIC ® 704 | BASF Corp. | 5500 | 15 |
| D-12 | TETRONIC ® 908 | BASF Corp. | 25000 | 31 |

Generally, surfactants useful in the present invention are well known in the art and many of them are commercially available as indicated above. Typically the surfactant comprises water-soluble or dispersible polymers either linear or branched. Preferred surfactants comprise various poly (ethylene oxide) block containing polymers. The preferred surfactants are amphipathic in nature. Such a surfactant comprises in its molecule an oleophilic group of sufficient length to adsorb firmly to the surface of the dispersed polymer particles and also comprises a hydrophilic group of sufficient length to provide a large enough steric barrier to interparticle attraction. The hydrophilic segment may or may not comprise ionic groups and the oleophilic segment may or may not comprise polarizable groups. Ionic groups, if present, in the hydrophilic segment of the polymer provide added colloidal stabilization through ionic repulsion between the dispersed particles of the polymer. The polarizable groups, if present, in the oleophilic segment of the polymer further enhance association of the surfactant with dispersed hydrophobic polymers.

Polymeric surfactants for use in acccordance with a second preferred embodiment of the invention comprise polyethylene oxide and polypropylene oxide (or higher alkylene oxide) units linked through a polyamine group, such as an ethylene diamine or tetramethylene diamine group. Particularly preferred surfactants in accordance with such embodiment are as indicated in Formula II:

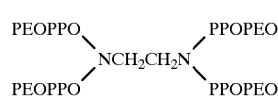

II wherein PEO is poly(ethylene oxide) and PPO is poly (propylene oxide). The molecular weight of this material is preferably greater than about 5,000.

Specific examples of the above block copolymeric surfactants of Formula II which may be used in the invention include the following:

Any amount of polymeric surfactant can be used in the dispersions of the invention as long as enough is present to stabilize the aqueous polymer dispersion in the presence of the hydrated metal salt of a strong acid. The amount of polymeric surfactant used in accordance with the invention is preferably from a weight ratio of about 1:20 to about 2:1, more preferably about 1:10 to about 1:1, and most preferably about 1:10 to about 1:2, relative to the weight of the dispersed polymer. In general, the required amount of polymeric surfactant will be related to the HLB value of the surfactant, with HLB values of at least 8, more preferably at least about 11, and most preferably at least about 14 being desired in order to minimize the amount of polymeric surfactant required for effective dispersion stabilization. For dispersions in accordance with the invention including strong acid hydrated salts comprising a positive trivalent metal atom, polymeric surfactants having a hydrophilic block portion including at least 10 water soluble monomer units and HLB values of at least about 14 are particularly preferred.

The following examples are provided to further illustrate the invention.

EXAMPLE I

An aqueous polyester dispersion (Eastman Chemical Co. AQ-29D anionic polyester, P-13) (30% solids in water) was placed into a glass vial and a surfactant (10% solids in water) was added. The dispersion was agitated for thirty minutes, using a magnetic stirrer, before a specified amount of hydrated salt (20% solids in water), i.e., $Al_2(SO_4)_3.18H_2O$, was added to it. The final make-up of the dispersion was 10 g by weight of 12.5% solids. Tables 3 and 4 list the composition of each of dispersions E-1a through E-1e and C-1a through C-1e, respectively, which were based on surfactants D-1 and CD-1, respectively. Other dispersions, such as, E-2 (a–e) through E-7 (a–e) and C-2 (a–e) are based on surfactants D-2 through D-7 and CD-2, respectively. Control surfactants CD-1 and CD-2 were generally of Formula I above, but with lower n values as indicated below:

| SURFACTANT | TRADE NAME (MANUFACTURER) | R—⟨benzene⟩— | n | HLB |
|---|---|---|---|---|
| CD-1 | TRITON X-15 (UNION CARBIDE) | octylphenol | 1 | 3.6 |
| CD-2 | TRITON X-45 (UNION CARBIDE) | octylphenol | 5 | 10.4 |

The prepared dispersions were used to demonstrate the effect of various surfactants on the polymeric dispersion stability in the presence of an inorganic salt, such as $Al_2(SO_4)_3.18H_2O$, of high ionic strength (trivalent aluminum).

TABLE 3

| Dispersion | $Al_2(SO_4)_3 \cdot 18H_2O$ (pbw*) | AQ 29D (pbw) | D-1 (pbw) | Water (pbw) |
|---|---|---|---|---|
| E-1a | 11 | 104 | 10 | 875 |
| E-1b | 11 | 99 | 15 | 875 |
| E-1c | 11 | 94 | 20 | 875 |
| E-1d | 11 | 84 | 30 | 875 |
| B-1e | 11 | 74 | 40 | 875 |

*parts by weight

TABLE 4

| Dispersions | $Al_2(SO_4)_3 \cdot 18H_2O$ (pbw*) | AQ 29D (pbw) | CD-1 (pbw) | Water (pbw) |
|---|---|---|---|---|
| C-1a | 11 | 104 | 10 | 875 |
| C-1b | 11 | 99 | 15 | 875 |
| C-1c | 11 | 94 | 20 | 875 |
| C-1d | 11 | 84 | 30 | 875 |
| C-1e | 11 | 74 | 40 | 875 |

*parts by weight

The above dispersions were evaluated for dispersion stability with time at ambient conditions, i.e., at 21° C. and 50% RH. Table 5 demonstrates the results of dispersion stability after 1-hour keeping.

TABLE 5

| Surfactants | 10 pbw* | 15 pbw | 20 pbw | 30 pbw | 40 pbw |
|---|---|---|---|---|---|
| D-1 | E-1a: F[1] | E-1b: F | E-1c: S | E-1d: S | E-1e: S |
| D-2 | E-2a: S[2] | E-2b: S | E-2c: S | E-2d: S | E-2e: S |
| D-3 | E-3a: S | E-3b: S | E-3c: S | E-3d: S | E-3e: S |
| D-4 | E-4a: F | E-4b: S | E-4c: S | E-4d: S | E-4e: S |
| D-5 | E-5a: F | E-5b: S | E-5c: S | E-5d: S | E-5e: S |
| D-6 | E-6a: F | E-6b: F | E-6c: F | E-6d: S | E-6e: S |
| D-7 | E-7a: F | E-7b: F | E-7c: F | E-7d: F | E-e: S |
| CD-1 | C-1a: F | C-1b: F | C-1c: F | C-1d: F | C-1e: F |
| CD-2 | C-2a: F | C-2b: F | C-2c: F | C-2d: F | C-2e: F |

[1]F: dispersion flocculates/coagulates with time on addition of hydrated metal salts of strong acids, such as $Al_2(SO_4)_3 \cdot 18H_2O$
[2]S: dispersion remains stable in the presence of hydrated salts of strong acids, such as $Al_2(SO_4)_3 \cdot 18H_2O$
*pbw = parts by weight Polymeric surfactants D-1 through D-7 in accordance with the invention stabilize the polyester dispersions very effectively even in the presence of an appreciable amount of inorganic salt $Al_2(SO_4)_3.18H_2O$ of high ionic strength (trivalency), whereas the addition of control surfactants CD-1 and CD-2, even when added in amounts up to 40 parts by weight (pbw), shows no improvement in dispersion stability.

EXAMPLE 2

The method of dispersion preparation was the same as that described in Example 1. Tables 6 and 7 list the composition of each of dispersions E-8a through E-8d and C-3a through C-3d, which were based on surfactants D-8 and CD-3, respectively. Other dispersions, such as, E-9 (a–d) through E12 (a–d) and C-4 (a–d) through C-7 (a–d) were based on surfactants D-9 through D-12 and CD-4 through CD-7, respectively. Control surfactants CD-3 and CD-4 were similar to Formula II above, except the PEO and PPO blocks are reversed. Control surfactants CD-5 through CD-7 comprise PEO-PPO-PEO block copolymers without a polyamine linking group. Source, molecular weights, and HLB values for the control surfactants are as follows:

| SURFACTANT | TRADE NAME | MANUFACTURER | MW | HLB |
|---|---|---|---|---|
| CD-3 | TETRONIC ® 90R4 | BASF Corp. | 7240 | 7 |
| CD-4 | TETRONIC ® 150R1 | BASF Corp. | 8000 | 1 |
| CD-5 | PLURONIC F-68 | BASF Corp. | 8400 | 29 |
| CD-6 | PLURONIC F-88 | BASF Corp. | 11400 | 28 |
| CD-7 | PLURONIC F-127 | BASF Corp. | 12600 | 22 |

The prepared dispersions were used to demonstrate the effect of various surfactants on the polymeric dispersion stability in the presence of $Al_2(SO_4)_3 \cdot 18H_2O$.

TABLE 6

| Dispersion | $Al_2(SO_4)_3 \cdot 18H_2O$ (pbw*) | AQ 29D (pbw) | D-8 (pbw) | Water (pbw) |
|---|---|---|---|---|
| E-8a | 11 | 89 | 25 | 875 |
| E-8b | 11 | 84 | 30 | 875 |
| B-8c | 11 | 79 | 35 | 875 |
| E-8d | 11 | 74 | 40 | 875 |

*all amounts are shown as parts by weight

TABLE 7

| Dispersion | $Al_2(SO_4)_3 \cdot 18H_2O$ (pbw*) | AQ 29D (pbw) | CD-3 (pbw) | Water (pbw) |
|---|---|---|---|---|
| C-3a | 11 | 89 | 25 | 875 |
| C-3b | 11 | 84 | 30 | 875 |
| C-3c | 11 | 79 | 35 | 875 |
| C-3d | 11 | 74 | 40 | 875 |

*all amounts are shown in parts by weight

The above dispersions were evaluated for dispersion stability with time at ambient conditions, i.e., at 21° C. and 50% RH. Table 8 below demonstrates the results of dispersion stability after 1 hour keeping.

TABLE 8

| Surfactants | 25 pbw* | 30 pbw | 35 pbw | 40 pbw |
|---|---|---|---|---|
| D-8 | E-8a: S[1] | E-8b: S | E-8c: S | E-8d: S |
| D-9 | E-9a: S | E-9b: S | E-9c: S | E-9d: S |
| D-10 | E-10a: F[2] | E-10b: F | E-10c: S | E-10d: S |
| D-11 | E-11a: F | E-11b: F | E-11c: S | E-11d: S |
| D-12 | B-12a: S | E-12b: S | E-12c: S | E-12d: S |
| CD-3 | C-3a: F | C-3b: F | C-3c: F | C-3d: F |
| CD-4 | C-4a: F | C-4b: F | C-4c: F | C-4d: F |
| CD-5 | C-5a: F | C-5b: F | C-5c: F | C-5d: F |
| CD-6 | C-6a: F | C-6b: F | C-6c: F | C-6d: F |
| CD-7 | C-7a: F | C-7b: F | C-1c: F | C-1d: F |

[1]S: dispersion remains stable in the presence of hydrated transition metal or metalloid salts of strong acids, such as $Al_2(SO_4)_3 \cdot 18H_2O$
[2]F: dispersion flocculates/coagulates with time on addition of hydrated transition metal or metalloid salts of strong acids, such as $Al_2(SO_4)_3 \cdot 18H_2O$
*pbw = parts by weight Nonionic polymeric surfactants D-8 through D-12 stabilize the polyester dispersions very effectively even in the presence of inorganic salt $Al_2(SO_4)_3 \cdot 18H_2O$ of high ionic strength (trivalency), whereas the addition of control nonionic surfactants CD-3 through CD-7, even in amounts up to 40 pbw, shows no improvement on dispersion stability.

The invention has been described in detail with particular reference to preferred embodiments thereof, but it will be understood that variations and modifications can be effected within the spirit and scope of the invention.

What is claimed is:

1. An aqueous dispersion comprising a dispersed polymer, obtained by combining (i) the dispersed polymer (ii) a hydrated metal salt of a strong acid, and (iii) a polymeric surfactant comprising a hydrophobic component containing an aryl radical containing at least 7 carbon atoms and a hydrophilic block component containing at least six repeat units derived from water-soluble monomers, or a multifunctional block copolymeric surfactant derived from the sequential addition of propylene oxide or higher alkylene oxide units and subsequently ethylene oxide units to a polyamine moiety.

2. The dispersion of claim I wherein the dispersed polymer comprises a polyester.

3. The dispersion of claim 2 wherein the dispersed polymer contains ionic monomer units.

4. The dispersion of claim 2 wherein the dispersed polymer comprises a polyester synthesized from dicarboxylates and diols according to the following structure:

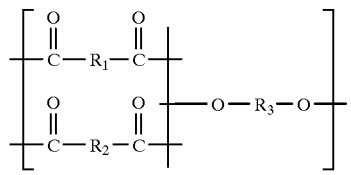

wherein $R_1$ is derived from an aliphatic dicarboxylate, a cycloaliphatic dicarboxylate, or an aromatic dicarboxylate;

$R_2$ is derived from a sulfonated dicarboxylate; and $R_3$ is derived from an aliphatic diol, a fatty acid dimer diol, a cycloaliphatic diol, a glycol, or a prepolymer.

5. The dispersion of claim 2 wherein said hydrated metal salt of a strong acid is a hydrated form of: aluminum sulfate, aluminum nitrate, aluminum chloride, potassium aluminum sulfate, zinc sulfate, zinc nitrate, zinc chloride, nickel sulfate, nickel nitrate, nickel chloride, ferric sulfate, ferric chloride, ferric nitrate, cupric sulfate, cupric chloride, cupric nitrate, antimony (III) chloride, cobalt (II) chloride, ferrous sulfate, stannic chloride, aluminum trichloroacetate, zinc bromide, aluminum tosylate, or zirconium (IV) chloride.

6. The dispersion of claim 2 wherein said hydrated metal salt of a strong acid is $Al_2(SO_4)_3 \cdot 18H_2O$, $AlK(SO_4)_2 \cdot 12H_2O$, $NiSO_4 \cdot 6H_2O$, $ZnSO_4 \cdot 7H_2O$, $CuSO_4 \cdot 5H_2O$, $Fe_2(SO_4)_3 \cdot 4H_2O$, $Al(NO_3)_3 \cdot 9H_2O$, $Ni(NO_3)_2 \cdot 6H_2O$, $Zn(NO_3)_2 \cdot 6H_2O$, $Fe(NO_3)_3 \cdot 9H_2O$ or $AlCl_3 \cdot 6H_2O$.

7. The dispersion of claim 2 wherein the metal salt comprises a positive trivalent atom.

8. The dispersion of claim 7 comprising a nonionic aryl polyoxyethylene ether polymeric surfactant having the formula:

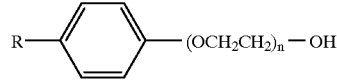

where R is an aryl, alkyl or aralkyl group having from 1 to about 20 carbon atoms, and n has an average value greater than or equal to 10.

9. The dispersion of claim 7 comprising a multifunctional block copolymeric surfactant derived from the sequential addition of propylene oxide units and ethylene oxide units to a diamino moiety and having the following formula:

wherein PEO is poly(ethylene oxide) and PPO is poly (propylene oxide).

10. The dispersion of claim 7 wherein the polymeric surfactant or multifunctional block copolymeric surfactant has an HLB value of greater than or equal to about 14.

11. The dispersion of claim 2 wherein the hydrated metal salt of a strong acid is combined at a weight ratio of from about 1:20 to 1:5, relative to the concentration of the dispersed polymer.

12. The dispersion of claim 11 wherein the polymeric surfactant or multifunctional block copolymeric surfactant is combined at a weight ratio of from about 1:10 to about 1:1, relative to the weight of the dispersed polymer.

13. The dispersion of claim 1 wherein said polymeric surfactant or multifunctional block copolymeric surfactant has an HLB value of greater than 8.

14. The dispersion of claim 1 wherein said polymeric surfactant or multifunctional block copolymeric surfactant has an HLB value of greater than 11.

15. The dispersion of claim 1 wherein said polymeric surfactant or multifunctional block copolymeric surfactant has an HLB value of greater than 14.

16. The dispersion of claim 1 comprising a polymeric surfactant comprising a hydrophobic component containing an aryl radical containing at least 7 carbon atoms and a hydrophilic block component containing at least six repeat units derived from water-soluble monomers.

17. The dispersion of claim 16 wherein the at least six repeat units derived from water-soluble monomers comprise at lease 6 ethylene oxide units.

18. The dispersion of claim 1 comprising a multifunctional block copolymeric surfactant derived from the sequential addition of propylene oxide or higher alkylene oxide units and subsequently ethylene oxide units to a polyamine moiety.

19. The dispersion of claim 1 wherein the hydrated metal salt of a strong acid is combined at a weight ratio of from about 1:20 to 1:5, relative to the concentration of the dispersed polymer.

20. The dispersion of claim 1 wherein the polymeric surfactant or multifunctional block copolymeric surfactant is combined at a weight ratio of from about 1:10 to about 1:1, relative to the weight of the dispersed polymer.

* * * * *